United States Patent [19]
Favreau et al.

[11] 3,856,990
[45] Dec. 24, 1974

[54] CONTINUOUS FILM DRIVE FOR A TELECINE EQUIPMENT

[75] Inventors: Michel Favreau; Serge Vidal, both of Paris, France

[73] Assignee: Thomson-CSF, Paris, France

[22] Filed: Sept. 28, 1972

[21] Appl. No.: 292,941

[30] Foreign Application Priority Data
Oct. 22, 1971 France .............................. 71.38066

[52] U.S. Cl............. 178/7.2, 178/7.6, 178/DIG. 28
[51] Int. Cl. ........................................... H04n 1/06
[58] Field of Search............... 178/DIG. 28, 7.1, 7.2, 178/6.8, 6.7 A, 6.7 R

[56] References Cited
UNITED STATES PATENTS
1,661,167  3/1928  Clark et al. ...................... 178/6.7 R
3,165,593  1/1965  Roman ......................... 179/100.3 L
3,655,908  4/1972  Goldberg........................ 178/5.4 CD Primary Examiner—Richard Murray
Attorney, Agent, or Firm—Cushman, Darby & Cushman

[57]  ABSTRACT

In a continuous film drive device for a telecine equipment of the flying spot scanner type, a drum has its circumference in the form of a groove for receiving and supporting the film in front of the optical system, an optical path being provided inside said drum between the optical system and the modulated light collecting means of the equipment.

The drum may act a flywheel, or drive a flywheel. It may also be driven by a motor.

7 Claims, 4 Drawing Figures

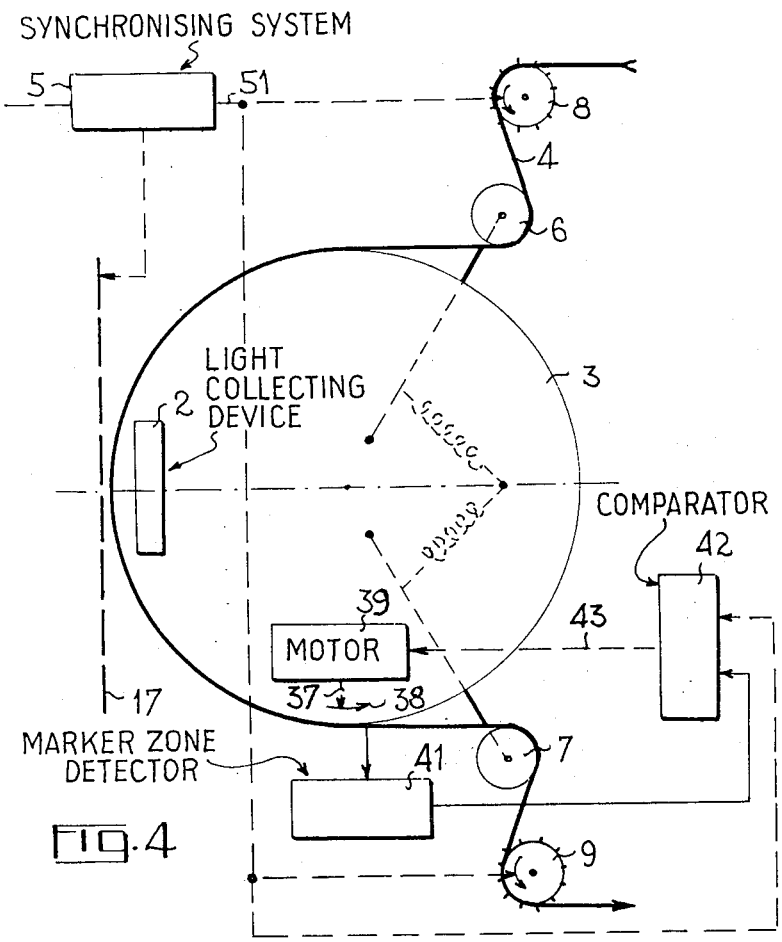
Fig. 4
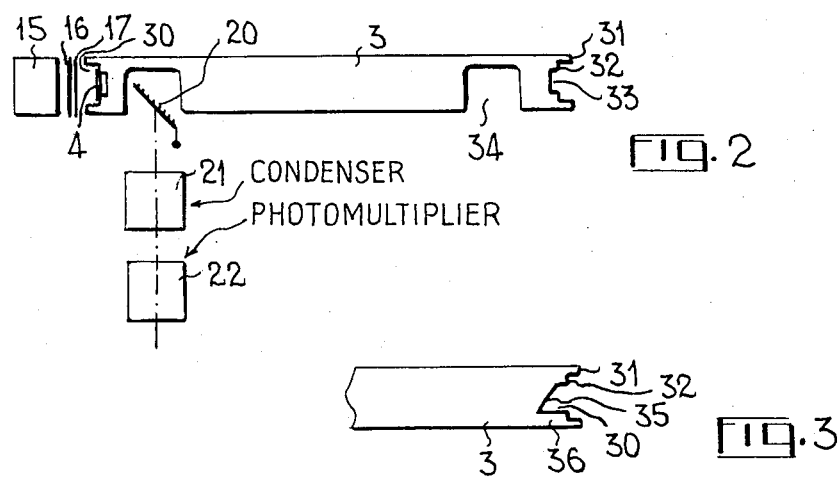
Fig. 2
Fig. 3

CONTINUOUS FILM DRIVE FOR A TELECINE EQUIPMENT

The present invention relates to a continuous drive device for films of the kind intended in particular for telecine work, utilizing a flying spot scanner tube, and is concerned with the stabilization of this drive movement.

In a telecine system using a flying spot scanner tube, the stability of the film movement is a factor of especial importance because of the synchronizing requirements involved in the mode of operation, which is as follows:

Each frame of the film is scanned by a moving light-spot which is an image of the light-spot scanning the screen of the scanner tube in accordance with television lines and fields; a light beam, modulated by the variable transparency of the film, is directed onto photomultipliers delivering television video signals. When two scanning fields are provided per frame (that is to say second order interlacing), the telecine system comprises a double lens transmitting two light beams, and a synchronous shutter in the neighbourhood of the film, so that as the film continuously displaces, each frame is consecutively scanned in the form of an odd field and an even field, the quality of the final image, and in particular of the interlacing, is associated with the uniformity of movement of the film so that clearly this uniformity must be of a very high order.

Various continuous film drive systems are known and, amongst these, more particularly direct film drive systems using two sprockets, controlled with very high accuracy by a high-grade motor and reduction gear set of the fully balanced high-inertia type; the drawbacks of such systems, in addition to their very high cost, include difficulties associated with the engagement of the small teeth in the film, and in particular the jerking which this engagement can produce especially in the context of 8 and 16 mm films.

Equally well-known are systems utilizing an auxiliary stabilization technique, effected by two intermediate flywheels arranged in the neighbourhood of the optical system of the telecine equipment, at either side thereof. However, this auxiliary device has other drawbacks; these include the possibility of low-frequency oscillations due to coupling between the inertias of the two intermediate flywheels, the design of which latter is moreover made difficult because of the requirements for both high inertia and good balancing; further, there is a risk of the film slipping off the flywheels and consequent inaccuracy of the framing of the film due to inaccuracy in its position relatively to the optical system of the telecine equipment.

The object of the present invention is a continuous drive device for telecine films, which makes it possible to overcome the aforesaid drawbacks.

According to the invention, there is provided a continuous film drive device for a telecine equipment comprising a flying spot scanner tube, an optical system, and modulated light collecting means, said drive device including a drum, the circumference of which is in the form of a groove for receiving and supporting the portion of the film being scanned, an optical path between said optical system and said modulated light collecting means being provided inside said drum.

In one embodiment of the invention, the drum is mounted to rotate freely about its axis, and forms a single flywheel ensuring the stabilization of the film speed, or drives such a flywheel.

In other embodiments of the invention, the drum is continuously driven by a motor.

The invention will be better understood, and other of its features rendered apparent, from a consideration of the ensuing description and the attached drawings in which:

FIG. 2 illustrates a top view of this embodiment;

FIG. 3 illustrates a variant embodiment of a detail of FIG. 2;

Figure 1:
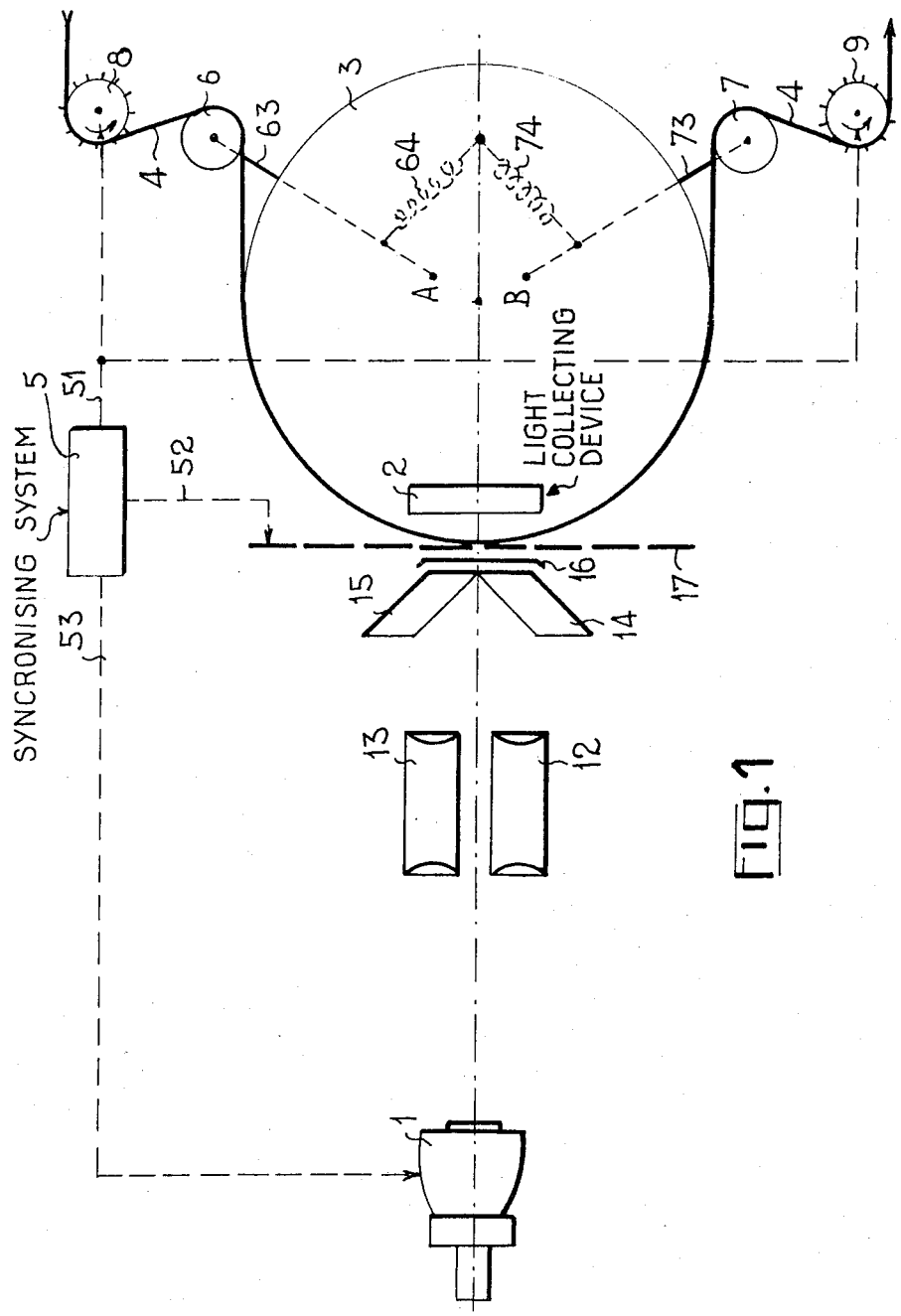
FIG. 1 illustrates a sectional view of an embodiment of the device in accordance with the invention.

FIG. 4 schematically illustrates a variant embodiment of the device in accordance with the invention.

FIG. 1 illustrates a diagram of an embodiment of the invention, for a telecine system comprising a conventional twin optical channel.

The telecine system comprises a flying spot scanner tube 1, a double lens, 12 and 13, a double set of prisms 14 and 15, an opaque plate 16 in which a double scanning window has been cut, and a shutter 17 schematically represented by broken lines; these various elements are located in front of the film and, in the conventional way, effect scanning, double scanning in the present example, of each frame of the film 4.

The film drive device is constituted, considered successively in the direction of movement of the film, by:

a film feed spool, not shown in the drawing; a sprocket 8 toothed at a pitch corresponding to the perforations of the film; an idle roller 6; a drum 3, which, in the described embodiment is a large diameter one, for example around 20 cm for a 16 mm film (in a general way the diameter of the drum, taking into account other factors such as the friction coefficient of the film on the drum, will be chosen sufficiently large for ensuring a sufficient adhesion of the film to the drum); a second idle roller 7, a second sprocket 9 similar to the first one, and a take-up spool which has not been shown. The spindle of each of the idle rollers 6 and 7 is connected by a rigid rod, respectively 63 and 73, to a fixed point, respectively A and B, about which it is articulated; a return spring (64 and 74) is attached to each rod (63 and 73 respectively); the rollers 6 and 7 thus on the one hand tension the film between the sprockets 8 and 9 and on the other hand decouple the sprockets from the drum so that the latter's movement is not subjected to jerking as a consequence of the engagement of the teeth of the sprockets in the film perforations.

The collection of the light beam which has passed through the film 4, is effected through the groove of the drum 3 carrying the film, by a device, symbolized by a block 2, an embodiment of which has been shown in FIG. 2, the latter being a top view of a part, including the drum 3, of the telecine.

In this FIG. 2, the set of prisms 15, the plate 16 and the shutter 17, arranged in this order in front of the drum 3, whose groove 30 carries the film 4, can be seen.

The groove 30 comprises two shoulders 32 carrying the perforated part of the film and separated by a central recess 33 designed to prevent the picture part of the film from being impaired by scraping; the film is laterally held in position by two flanges 31. The collection of the light passing through the film involves a deflection inside the drum, where the path on either side of the deflector is formed by cut-away or transparent parts.

In the particular embodiment shown in FIG. 2, the drum is made of a transparent material (glass or plexiglass) and contains a further recess 34 designed to receive a deflector element directing the light onto a condenser 21 and a photomultiplier 22 supplying the television video signal. In this embodiment, the deflector system is constituted by a mirror 20 disposed at 45° to the direction of the light beam. The mirror 20 could quite readily be replaced by a prism to produce this deflection.

FIG. 3 illustrates a variant embodiment of the groove 30 of the drum 3, in which the shoulders 32 are separated by a deeper recess 35 the bottom of which is a polished, silvered surface, replacing the fixed mirror 20 of FIG. 2, the drum still being made of a transparent material at least as far as the portion 36 thereof, in the path of the reflected beam, is concerned.

The telecine system moreover comprises (FIG. 1) a synchronizing system, schematically represented by a block 5, producing control signals, whose routing is illustrated in broken-line in FIG. 1, destined for:

the scanner tube 1 (control 53) in order to control the scanning motion of the light beam; the shutter 17 (control 52) in order to control its movement; and the sprockets 8 and 9 (control 51) in order to control the speed of transport of the film 4. The frequency of the control signals applied for driving the sprockets is of course a function of the field frequency of the television signals.

In operation, the film 4 rests upon the groove 30 of the drum 3 as it passes before the optical system of the telecine equipment, this in order to prevent warping of the surface of the film, in front of the optical system of the telecine equipment, this effect occurring when the film, stretched between two points, is not provided with any intermediate support. The film is moreover supported by the drum 3 over more than half the circumference of the latter in order to ensure that there is sufficient adhesion between these two elements to prevent any possibility of slip.

In the described embodiment, the film 4 is driven by the two synchronously operating sprockets 8 and 9 running at a quasi-constant speed; the film drives the drum 3 which then acts as a large-diameter slow-speed flywheel, stabilizing the speed of the film.

Variant embodiments of this device are possible, in which embodiments the drum is constituted by a light material, a high-inertia disc being either directly integrated with the drum or coupled to the drum spindle. It is equally possible to arrange for the drum to drive at high speed a small-diameter high-inertia disc, this through the medium of a roller arranged at the drum circumference.

FIG. 4 schematically illustrates a variant embodiment of the device in accordance with the invention in which, of the optical section of the telecine system, only the shutter 17, disposed immediately in front of the film, in the path of the scanner light ray, and the block 2 of FIG. 1, are shown.

The film drive device comprises, as before, two sprockets 8 and 9, the two idle rollers 6 and 7 and the drum 3. A low-speed motor 39 fitted in the drum drives the latter, this being indicated in the diagram by a control 37 and an arrow 38 to indicate the direction of the movement imparted in this example; a device, symbolized by the block 41, and which will be referred to as a marker zone detector supplies an electrical reference signal when a film perforation or similar marker associated with the position of the film frames passes through a given point. The device 41 may for example comprise a photoelectric detector detecting the passage of the perforations of the film in the above mentioned predetermined point, this by means of an auxiliary light source, and a shaping and differentiating circuit delivering pulses whose phases are constant relatively to the passage of the perforations through the given point. A comparator 42 receiving on the one hand the electrical signals coming from the marker zone detector 41 and on the other hand the synchronizing signals produced by the synchronizing system 5 for supply to the sprockets 8 and 9 (control 51). The position of the photoelectric detector of the device 41 should be such that the signals received by the comparator 42 are in phase when the speed of the film is perfectly uniform, and when in particular the film is not slipping on the drum 3; if there is any irregularity in the film speed, the comparator 42 will supply a signal representing the phase difference existing between the signals received by it, this signal being used to control the speed of the film through acting on the speed of the motor 39; this mechanism is schematically illustrated in the drawing by the control 43.

This device thus makes it possible, in addition to the attainment of high stability in the film drive movement, to effect automatic and accurate centering of the film in front of the optical system of the telecine equipment.

In a variant embodiment of the synchronizing device the electrical signals which are supplied by the marker zone detector may be produced at a frequency much higher than the frequency at which the film frames pass through a given point. To this end marker zones, the number of which is much higher than that of the film frames, are registered on a special zone of the film. The comparison of the output signal from the marker zone detector with a reference signal, whose frequency and phase are determined by the synchronizing system, makes it possible to achieve a substantial increase in the rapidity of control of the motor, provided that the inertia of the mechanical device is not too high. The frequency of the reference signal can advantageously be made equal to the standard 625 lines horizontal scanning frequency, used by the scanner tube, which frequency is equal to 15 Kc/s.

As far as the adhesion of the film to the drum is sufficient the synchronizing effect may be secured by controlling the speed of the drum itself; to this end the drum 3 is provided with marker zones which can be recorded for example on a magnetic tape attached to the circumference of the drum.

In accordance with another variant embodiment of the invention the film 4 is driven purely by virtue of its adhesion to the drum 3; in this case the film drive device is similar to the device shown on FIG. 4 (except for the sprockets 8 and 9 which are no longer used) and so it includes means for controlling the speed of the film as a function of the synchronizing signals.

In accordance with a further variant embodiment of the invention, especially suited to the case of a reproduction system not associated with an external synchronizing source, as for example a large-format public telecine installation, the foregoing device is simplified by the use, for the purpose of driving the drum 3, of a special motor 39 with an automatic speed stabilization, the scanner tube being controlled by special information contained in the film itself.

It will be observed, on the other hand, that the locating of the scanning system and of the modulated light collecting system may be inverted, the optical path provided inside the drum being then designed for the light incident on the film.

What is claimed is:

1. A continuous film drive device for a telecine equipment comprising a flying spot scanner tube, said flying spot scanner tube having a line sweep direction and a field sweep direction, an optical system, and modulated light collecting means, said drive device including a drum, the diameter of which is large as compared with the height of the frame of the films to be analysed, the circumference of which is in the form of a groove for receiving and supporting the portion of the film being scanned and the axis of which is parallel to said line sweep direction, an optical path between said optical system and said modulated light collecting means being provided inside said drum.

2. A drive device as claimed in claim 1, wherein the path for the film comprises about one half of the drum circumference.

3. A drive device as claimed in claim 1, comprising two sprockets for driving the film, and wherein said drum is mounted freely about its axis so as to be rotated by the movement of the film.

4. A drive device as claimed in claim 3, wherein said drum has sufficient inertia to act as a flywheel.

5. A drive device as claimed in claim 3, further comprising a flywheel, whose movement is coupled to that of the drum.

6. A drive device as claimed in claim 1, comprising a motor for driving said drum.

7. A drive device as claimed in claim 6, comprising two sprockets for driving the film to be analysed, means for controlling the rotation of said sprockets, and a control circuit for synchronizing the speed of said film as a function of the control signals applied to said sprockets, through acting on the speed of said motor.

* * * * *